Sept. 2, 1969  W. TRANKNER  3,464,337
MIRROR REFLEX CAMERA WITH INTERNAL PHOTOELECTRIC LIGHT METER
Filed April 15, 1966  2 Sheets-Sheet 1

INVENTOR
WERNER TRANKNER
By Young + Thompson
ATTYS.

3,464,337
MIRROR REFLEX CAMERA WITH INTERNAL PHOTOELECTRIC LIGHT METER
Werner Trankner, Dresden, Germany, assignor to VEB Pentacon Dresden Kamera- und Kinowerke, Dresden, Germany
Filed Apr. 15, 1966, Ser. No. 542,851
Int. Cl. G03b 19/12
U.S. Cl. 95—42                                                                 11 Claims

ABSTRACT OF THE DISCLOSURE

In a reflex camera with a built in photoelectric exposure meter system, a light-permeable plate is positioned between the reflex mirror and the viewfinder. In the plate a plurality of semireflecting oblique surfaces are provided which act to form a continuous prismatic line raster of reflectors. These semireflecting surfaces are arranged between planes parallel to the light entry surface of the plate. As a consequence of the location of these semireflecting surfaces the light which enters the camera is separated so that a portion is reflected away from the optical axis and is sensed by one or more photocells positioned on the outer edges of the plate. The remainder of the light is transmitted directly through the plate for displaying the image in the viewfinder.

Background of invention

The invention relates to a reflex camera with a built-in photoelectric internal exposure meter system and with flat beam splitting devices which are situated in the path of the exposure or view finding rays and consist of a number of reflection surfaces and of which the semireflecting oblique surfaces are arranged in succession and at right angles to the path of rays in such a manner that the rays of light reflected from the oblique surfaces are totally reflected by the light entry surface of the beam splitting device, and that the photoelectric cell or photoresistance is situated parallel or approximately parallel outside the path of the exposure or view finding rays.

Reflex cameras with a built-in photoelectric exposure meter system, consisting of a beam splitting device in the form of a cube situated in the path of the view-finding rays or exposure rays, or of a flat beam splitter composed of a number of prisms, with photoelectric cells or photoresistances situated outside the path of the rays, are already well known. The drawbacks from which these cameras suffer, when beam splitting cubes are used, reside in the fact that considerable space is required to accommodate the beam splitting device, that the photoresistance is not in the immediate vicinity of the point at which the image is formed and that the incidence of incorrect light can only be eliminated by supplementary devices. When use is made of flat beam splitters consisting of a number of prisms or a number of reflection surfaces the over-all height involved is found to be a disadvantage, particularly when the beam splitter is to be accommodated between the reflex mirror and the image setting plane or between this latter and the pentagonal prism, in addition to the visibility of edges of prisms cemented together or of the edges of the fully mirror-coated surfaces situated obliquely in the path of the view finding rays.

In order to reduce the cost of manufacturing beam splitters, it is the purpose of the invention to reduce the over-all height still further and to ensure that in the view finder image, even when the camera has been partly stopped down, no interference will be caused by edges rendered visible as a result of the partly semi-reflecting surfaces situated in the path of the rays.

Summary of invention

This problem is solved by the provision according to the invention of a reflex camera having a view-finder and a built-in photoelectric exposure meter system including a photosensitive device and the provision of a beam splitting device 10 situated in the path of the light rays from the camera objective, said beam splitting device comprising: (a) a body of light permeable material having a light entry surface 16 at right angles to the ray path, an emergent surface for light for viewing, and at least one light-emergent side surface 14 through which light split from the ray path passes, and (b) a plurality of semireflecting oblique surfaces 11 within and totally enclosed by said body, forming a continuous prismatic line raster arranged between planes parallel to the light entry surface of the body, said oblique surfaces reflecting a portion of the light entering the body to the internal surface of the light entry surface of the body, which internal light entry surface totally reflects said portion to the light emergent side surface, (c) the photosensitive device of the meter system being situated parallel or approximately parallel to and outside the light path and receives the totally reflected portion passing through said light emergent side surface in a flat ray dividing structure made in one piece or consisting of a number of pieces, several partly mirror-coated reflection surfaces are included, which are situated obliquely in respect of the direction of the light, a photoelectric cell or a photoresistance being provided, in the known manner, on at least one light emergence surface situated parallel to the path of the view finding rays and belonging to the ray dividing structure. According to a further characteristic of the invention, the ray dividing structure consists of at least two parts, its separating surfaces situated at right angles to the direction of the light being cemented together and constructed in such a manner that they have a number of reflection surfaces situated obliquely in respect of the direction of the incidence of light, one of the separating surfaces being partly mirror-coated. A particularly advantageous feature is that the separating surfaces of the ray dividing structure have a cohesive prismatic line raster.

The advantages provided by the invention are that the beam splitter structure is barely half as thick as the known flat types of splitter, its thickness being thus 3–4 mm. for example, so that this flat plate can be accommodated without difficulty underneath the image setting plane in a reflex camera. Furthermore, the edges of the semireflection surfaces enclosed in an optically transparent medium, such as glass or plastic, are no longer visible in the view finder image if they are suitably arranged. Use is made of a splitter structure consisting of two parts cemented together, their separating surfaces resulting in a continuous prismatic line raster over the entire image surface, the refractive index of the cementing medium being equal to that of the basic material, so that no undesirable edges will be visible, even with a particularly small aperture angle for the photographic lens.

Finally, in order to make space available for other purposes, it is possible to dispense entirely with the flat plate as a beam splitter if the partly semireflecting surfaces, according to a further principle of the invention, are situated inside an existing optical device, such as an image field lens, collective lens or pentagonal prism of the view finding system.

Brief description of drawings

The invention will be illustrated and described in conjunction with certain examples.

In the drawings.

Description of preferred embodiments

Figure 1:
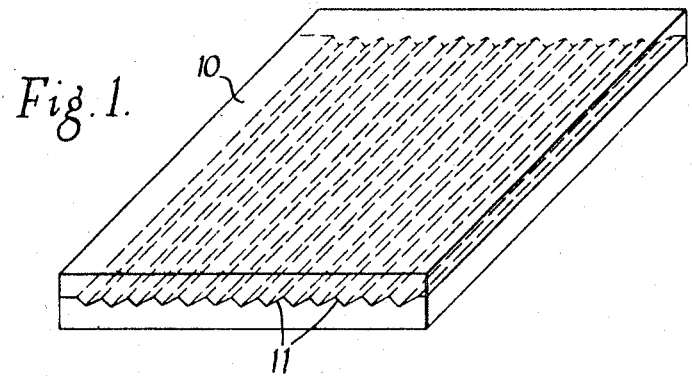
FIG. 1 is a view, in perspective, of the beam splitting device.
Figure 2:
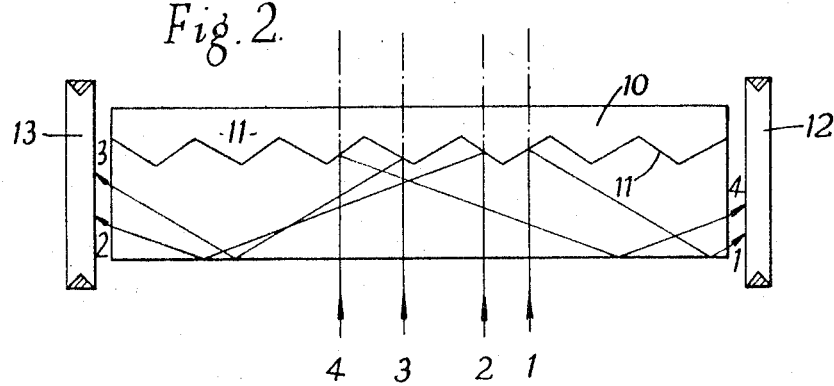
FIGS. 2 and 3 show the beam splitting device in section, with a photoresistance.
Figure 3:
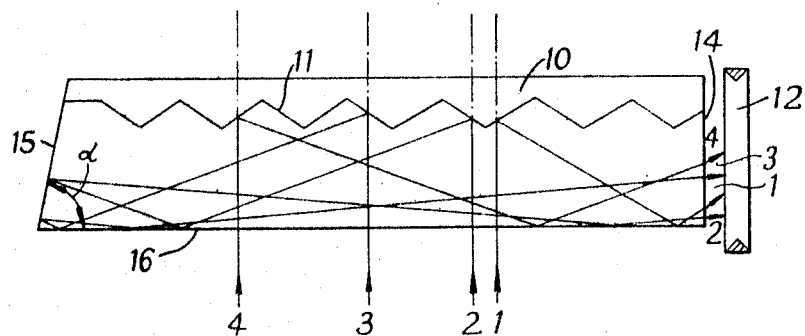

As may be seen from FIG. 1, a cohesive prismatic line raster 11, consisting of semireflecting surfaces, is enclosed in a flat transparent beam splitting device 10. FIGS. 2 and 3 are schematic diagrams of the path taken by the light rays inside the beam splitting device 10. The light rays 1 to 4, coming from the photographic lens, not shown in the drawing, are partly reflected by the semireflecting surfaces 11, the said surfaces being arranged, as shown in FIG. 2, in such a way that rays 1 and 4 fall on the photoresistance 12, by total reflection, while the rays 1 and 2 fall on the photoresistance 13, likewise by total reflection. FIG. 3 shows a version in which all the reflected light rays fall on one photoresistance 12 only. The reflecting surface 15, situated opposite the light emergence surface 14 serving for the light rays to be reflected, encloses an angle α in respect of the light entry surface 16 of the beam splitting device 10, this angle being smaller than 90°.

As may be seen from the path taken by the rays in FIG. 3, the light rays 2 and 3 are reflected from the surface 16 onto the reflecting surface 15, by total reflection, and pass from the latter surface, again by total reflection, to the light emergence suface 14 and finally to the photoresistance 12.

Figure 4:
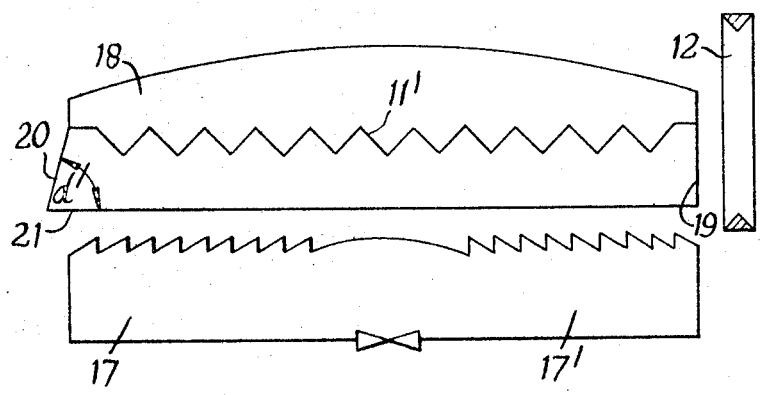
FIG. 4 shows the beam splitting device inside collective lens of the view finding system.

FIG. 4 shows an image field lens system in which above the image field lens 17, provided with central focusing lenses and Fresnel rings, there is a collective lens 18 in which the semi-reflecting surfaces 11' are enclosed as a prismatic line raster. Here again the reflective surface 20 situated opposite the light emergence surface 19 encloses an angle α', in respect of the light entry surface 21, this angle likewise being smaller than 90°. On analogous lines the semireflecting surface 11' can be included in the image field lens 17 instead of the collective lens 18. In this case the light entry surface 17' is brightly polished or surface treated as opposed to being frosted, in order to ensure that all of the light rays will be reflected on the photoresistance 12.

Figure 5:
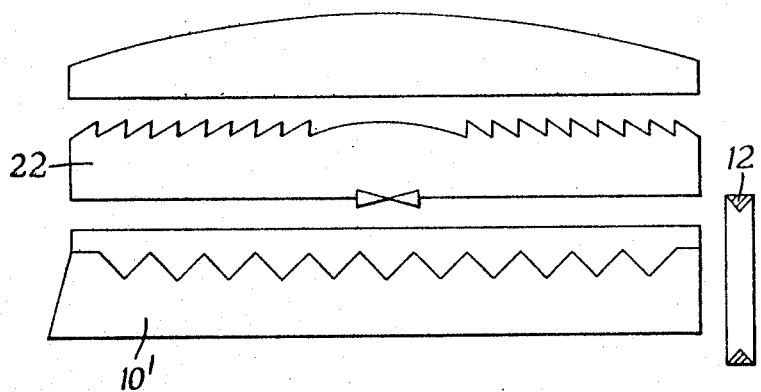
FIG. 5 shows the beam splitting device in conjunction with an image setting system.

As may be seen from FIG. 5, the flat ray dividing structure 10', as illustrated in FIG. 1, is situated underneath the image field lens 22.

Figure 6:
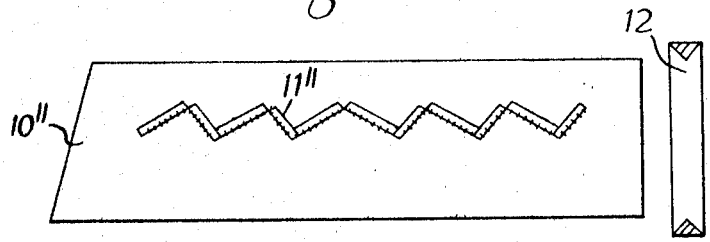
FIG. 6 shows a difference constructional version of the beam splitting device.

The beam splitting device, or semireflecting an additional optical member, in which the semireflecting surfaces are included, may be made either in one piece, which presents no difficulty in the case of plastic material as shown in FIG. 6, or in a number of pieces. When a number of parts are cemented together to form a beam splitting device care must be taken to ensure that the refractive index of the cementing medium is equal or approximately equal to that of the optical bodies to be cemented together. This ensures that no undesirable edges of the reflection surfaces will be visible in the view finder image. Instead of cementing a number of plastic bodies together, these latter, together with the semireflecting surfaces 11" included therein, can be combined to form one single part, such as part 10" in FIG. 6, by the casting process or the use of an adhesive, and with a heat treatment. Beam splitting structures made of casting resin, such as Duroplast, have the advantage of forming less gas in a vacuum, when the semireflecting coating operation is carried out, than the "sprayable" or "stampable" polystyrene or polymethacrylate. As the optical surfaces to be semireflecting coated are subjected to a high vacuum, the use of Duroplast for the beam splitting structure to which the invention relates is particularly advantageous.

Finally, it is also possible for the beamsplitting structure to form one single constructional unit with a pentagonal prism, in which case the oblique semireflecting surfaces are arranged between planes parallel to the light entry surface of the pentagonal prism and are enclosed within said prism. In the same way the prismatic line raster is enclosed in the pentagonal prism.

Furthermore, the beam splitting structure can be situated between the pentagonal prism and the view-finder lens. In the case of reflex cameras with interchangeable view-finder system it is obvious that the beam splitting structure must likewise be interchangeable either by itself or in conjunction with the view-finder system or parts thereof.

I claim:

1. In a reflex camera having a view finder and a built-in photoelectric exposure meter system including a photosensitive device and the provision of a beam-splitting device situated in the path of the light rays from the camera objective, said beam-splitting device comprising:

(a) a body of light-permeable material having a light entry surface at right angles to the ray path, an emergent surface for light for viewing, and at least one light emergent side surface through which light split from the ray path passes, and (b) a plurality of semireflecting oblique surfaces within and totally enclosed by said body forming a continuous prismatic line raster arranged between planes parallel to the light entry surface of the body, said oblique surfaces reflecting a portion of the light entering the body to the internal surface which totally reflects said portion to the light emergent side surface, (c) the photosensitive device of the meter system being situated parallel or approximately parallel to and outside the light path and receiving the totally reflected portion passing through said light emergent side surface.

2. A reflex camera according to claim 1, wherein the beam-splitting device is formed in two parts which are cemented together, the separating surfaces of which parts defining the semireflecting oblique surfaces, one of said separating surfaces carrying the semireflecting coating.

3. A reflex camera according to claim 2, wherein the separating surfaces of the ray-dividing structure form a prismatic line raster.

4. A reflex camera according to claim 1, wherein the surface situated opposite the side light emergent surface for the light rays to be reflected forms an acute angle with respect to the light entry surface and is reflective.

5. A reflex camera according to claim 2, wherein the cement between the separating surfaces have the same refractive index as the parts of the beam-splitting device.

6. A reflex camera according to claim 1 including a transparent optical member adjacent the beam-splitting device, provided with image-focusing lenses, said optical member consisting of at least one part.

7. A reflex camera according to claim 1, wherein a collective lens of the view finder system is formed integrally with the beam-splitting device.

8. A reflex camera according to claim 6, wherein the beam-splitting device is situated below the focusing lenses.

9. A reflex camera according to claim 6, wherein the beam-splitting device is situated above the focusing lenses.

10. A reflex camera according to claim 6, wherein the beam-splitting device is situated between a pentagonal viewing prism of the view finder system and the objective.

11. A reflex camera according to claim 1, wherein the view finder includes a pentagonal prism and said beam-splitting device forms a single constructional unit with the pentagonal prism, the oblique reflection surfaces being between planes parallel with the light entry surface of the pentagonal prism and enclosed within the latter.

References Cited

UNITED STATES PATENTS

| | | | |
|---|---|---|---|
| 2,851,919 | 9/1958 | Nesvadba | 95—44 XR |
| 3,174,417 | 3/1965 | Sauer et al. | 95—49 |
| 3,233,533 | 2/1966 | Sauer | 95—42 |

FOREIGN PATENTS 40,966  9/1965  Germany.

NORTON ANSHER, Primary Examiner

R. L. MOSES, Assistant Examiner

U.S. Cl. X.R.

95—44, 49